United States Patent
Alperovich et al.

(10) Patent No.: US 6,175,743 B1
(45) Date of Patent: Jan. 16, 2001

(54) SYSTEM AND METHOD FOR DELIVERY OF SHORT MESSAGE SERVICE MESSAGES TO A RESTRICTED GROUP OF SUBSCRIBERS

(75) Inventors: Vladimir Alperovich, Dallas; Eric Valentine, Plano, both of TX (US)

(73) Assignee: Ericsson Inc., Research Triangle Park, NC (US)

( * ) Notice: Under 35 U.S.C. 154(b), the term of this patent shall be extended for 0 days.

(21) Appl. No.: 09/071,402

(22) Filed: May 1, 1998

(51) Int. Cl.[7] .................................................. H04Q 7/20
(52) U.S. Cl. ............................................ 455/466; 455/566
(58) Field of Search .................................. 455/466, 435, 455/566, 38.4, 412, 413; 379/88.05, 88.06

(56) References Cited

U.S. PATENT DOCUMENTS

| | | | |
|---|---|---|---|
| 5,603,081 | * 2/1997 | Raith et al. | 455/435 |
| 5,604,921 | * 2/1997 | Alanara | 455/38.4 |
| 5,655,215 | * 8/1997 | Diachina et al. | 455/466 |
| 5,678,179 | * 10/1997 | Turcotte et al. | 455/466 |
| 5,909,651 | * 6/1999 | Chander et al. | 455/466 |
| 5,920,822 | * 7/1999 | Houde et al. | 455/466 |
| 5,920,826 | * 7/1999 | Metso et al. | 455/556 |

FOREIGN PATENT DOCUMENTS

| | | |
|---|---|---|
| 0 782 356 A2 | 12/1996 | (EP) . |
| 2 317 073 | 3/1998 | (GB) . |
| WO 95/12933 | 5/1995 | (WO) . |
| WO 96/10895 | 4/1996 | (WO) . |

OTHER PUBLICATIONS

European Telecommunications, Standards Institute; Digital Cellular Telecommunications System (Phase 2+); Technical Realization of Short Message Service Cell Broadcast (SMSCB) (GSM 03.41 version 5.6.1); ETS 300 902, Jan. 1998, Third Edition; pp. 1–28.

PCT International Search Report dated Aug. 25, 1999.

* cited by examiner

Primary Examiner—Nay Maung
Assistant Examiner—Quochien B. Vuong
(74) Attorney, Agent, or Firm—Jenkens & Gilchrist, P.C.

(57) ABSTRACT

A telecommunications system and method is disclosed for encapsulating header information associated with a Short Message Service (SMS) message within that SMS message, which can then be sent over a broadcast channel. This header information can contain, for example, additional information regarding the intended recipients of the SMS message. For example, a business with 100 employees may want to be able to broadcast a SMS message to all employees, but not to anyone else. Therefore, in this case, the header information can indicate "private" and include a unique user group identification (ID) code. A Subscriber Identity Module (SIM), or other memory, within each of the mobile terminals within the predefined group can contain a message application, which can compare the received group ID to a group ID stored in the SIM, and determine whether the message should be displayed on the mobile terminal.

22 Claims, 3 Drawing Sheets

SYSTEM AND METHOD FOR DELIVERY OF SHORT MESSAGE SERVICE MESSAGES TO A RESTRICTED GROUP OF SUBSCRIBERS

BACKGROUND OF THE PRESENT INVENTION

1. Field of the Invention

The present invention relates generally to telecommunications systems and methods for delivering Short Message Service (SMS) messages, and specifically to allowing a SMS message to be received by a specified group of subscribers.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system in use today, and described in more detail herein.

With reference now to FIG. 1 of the drawings, there is illustrated a GSM Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22.

Mobile Station (MS) 20 is the physical equipment, e.g., a car phone or other portable phone, used by mobile subscribers to communicate with the cellular network 10, each other, and users outside the subscribed network, both wireline and wireless. The MS 20 may also include a Subscriber Identity Module (SIM) card 13, or other memory, which provides storage of subscriber related information, such as a subscriber authentication key, temporary network data, and service related data (e.g. language preference).

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

With reference now to FIG. 2 of the drawings, text messages, containing up to 160 alpha numerical characters, can be sent to and from MSs 200, using the Short Message Service (SMS) 210. SMS 210 utilizes a Service Center 220, which stores and forwards short messages to MSs 200. A SMS 210 message can be sent from the Service Center 220 to the MS 200 or from the MS 200 to the Service Center 220.

The mobile terminated SMS 210 transfers a short message from the Service Center 220 to the MS 200. In addition, information about the delivery of the short message is returned to the Service Center 220. This information is either a delivery report, which confirms the delivery of the message to a recipient, or a failure report, which informs the originator that the short message was not delivered and the reason why. If the information is a failure report, the originator has the ability to order retransmission later.

A mobile terminated SMS message 210 typically originates by a user 240 sending a message to the Service Center 220, which then forwards the message to the SMS Gateway Mobile Switching Center (SMS-GMSC) 250. Thereafter, the SMS-GMSC 250 interrogates the HLR 260 for routing information pertaining to the designated MS 200. The HLR 260 returns this routing information to the SMS-GMSC 250, which can then route the message to the MSC/VLR 270 serving the location area (LA) 205 that the MS 200 is in. If the MS 200 is in IDLE mode (not in use), the MS 200 is paged, and a connection is set up between the MS 200 and the network 270, as in the normal call setup case. The MSC/VLR 270 then delivers the SMS message 210 to the MS 200. SMS messages 210 are preferably transmitted on the allocated signaling channel. However, if the MS 200 is in busy mode (in use), the SMS message 210 will be transmitted on the Slow Associated Control Channel (SACCH). In that case, no paging, call setup, or authentication need to be performed.

After the MSC/VLR 270 sends the SMS message 210 to the MS, a delivery report is sent from the serving MSC/VLR 270 to the Service Center 220. If delivery of the SMS message 210 was not successful, the HLR 260 is informed, and a failure report is sent to the Service Center 220. In addition, if the delivery was unsuccessful, a Messages Waiting service 215 within the Service Center 220 can optionally provide the HLR 260 and the serving MSC/VLR 270 with the information that there is a message in the originating Service Center 220 waiting to be delivered to the MS 200. Once the MS 200 becomes available for receipt of the SMS message 210, the HLR 260 informs the Service Center 220 and the SMS message 210 is sent again. The mobile terminated SMS message 210 can be input to the Service Center 220 by a variety of sources, e.g., speech, telex or facsimile.

A mobile originated SMS message can also be submitted by the MS 200 to the Service Center 220. The MS 200 first establishes a connection to the network (serving MSC/VLR 270), as in the case of a normal call setup. However, it should be noted that if the MS is in busy mode, a connection already exists. Once a connection is made with the serving MSC/VLR 270 and the authentication of MS 200 is confirmed, the MS 200 can send the SMS message to the Service Center 220 via the serving MSC/VLR 270. The Service Center 220 in turn forwards the SMS message 210 to its destination, which could be another MS 240 or a user in the fixed network (not shown), the former of which is illustrated in FIG. 2. Once the SMS message 210 is delivered to the end user 240, either a delivery report or a failure report is sent to the Service center 220.

The SMS messages 210 can currently be sent point-to point, e.g., from one subscriber to another subscriber, or can be broadcast to all subscribers in a cell 208. This latter method of delivery does not differentiate between particular groups of subscribers, as all subscribers within the cell 208 are treated as one group. Thus, many subscribers do not use SMS 210 to send messages to a particular group of subscribers, e.g., employees, because the SMS message 210 must be sent individually for each employee, using point-to-point, 15 unless the sending subscriber, e.g., a company, does not object to the SMS message 210 being sent to every subscriber in the broadcasted cell 208, not just the intended recipients.

It is, therefore, an object of the present invention to allow a SMS message to be received by a particular group of subscribers.

SUMMARY OF THE INVENTION

The present invention is directed to telecommunications systems and methods for encapsulating header information associated with a Short Message Service (SMS) message within that SMS message, which can then be sent over a broadcast channel. This header information can contain, for example, additional information regarding the intended recipients of the SMS message. For example, a business may want to be able to broadcast a SMS message to all employees, but not to anyone else. Therefore, in this case, the header information can indicate "private" and include a unique user group ID. A Subscriber Identity Module (SIM), or other memory, within each of the mobile terminals within the predefined group can contain a message application, which can compare the received group ID to a group ID stored in the SIM, and determine whether the message should be displayed on the mobile terminal to the receiving subscriber. In addition, other information may be included in the header, such as the language of the SMS message, which will allow the receiving subscriber to filter out SMS messages in languages not understood by that subscriber.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
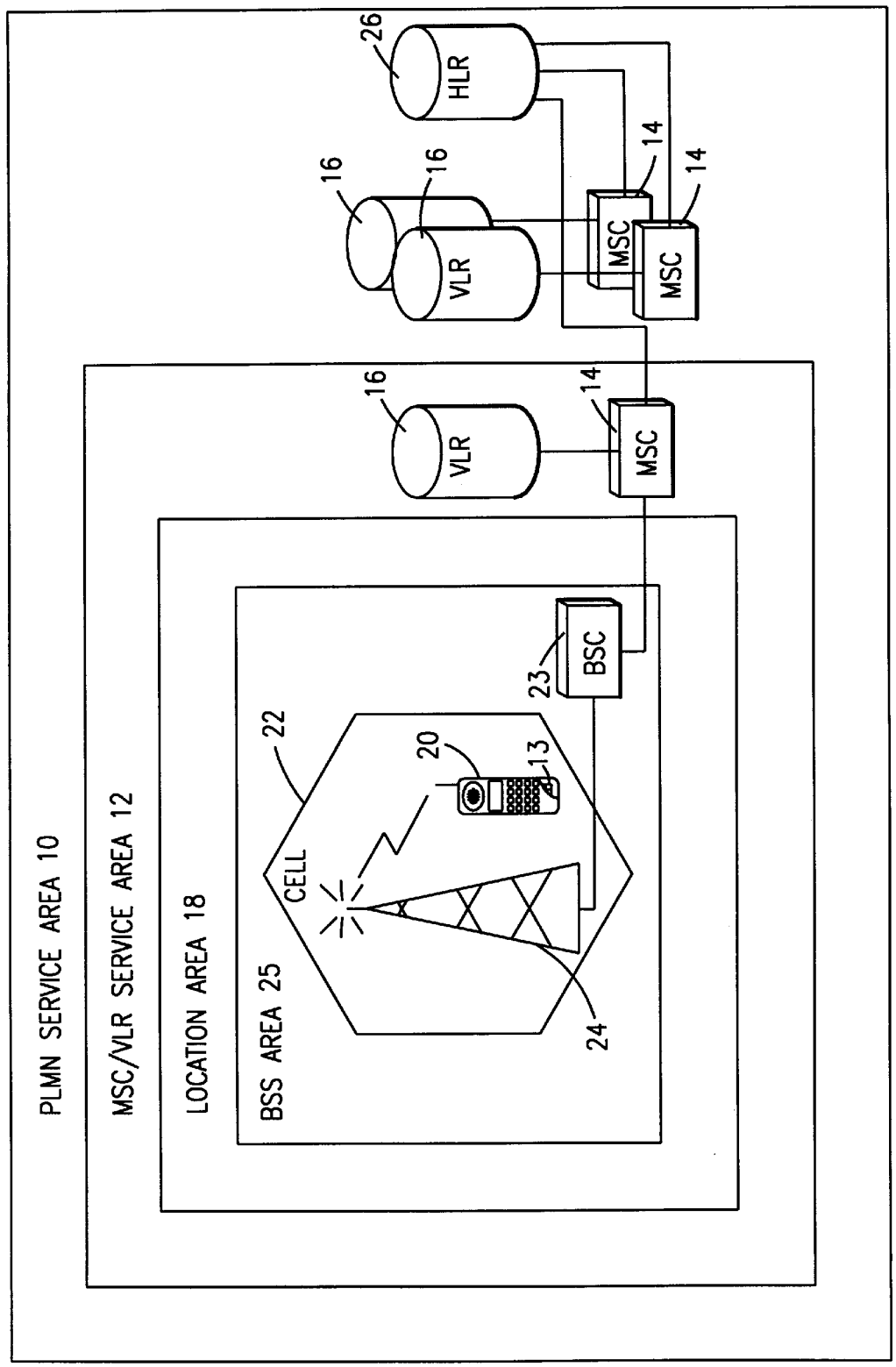
FIG. 1 is a block diagram of a conventional terrestrially-based wireless telecommunications system.
Figure 2:
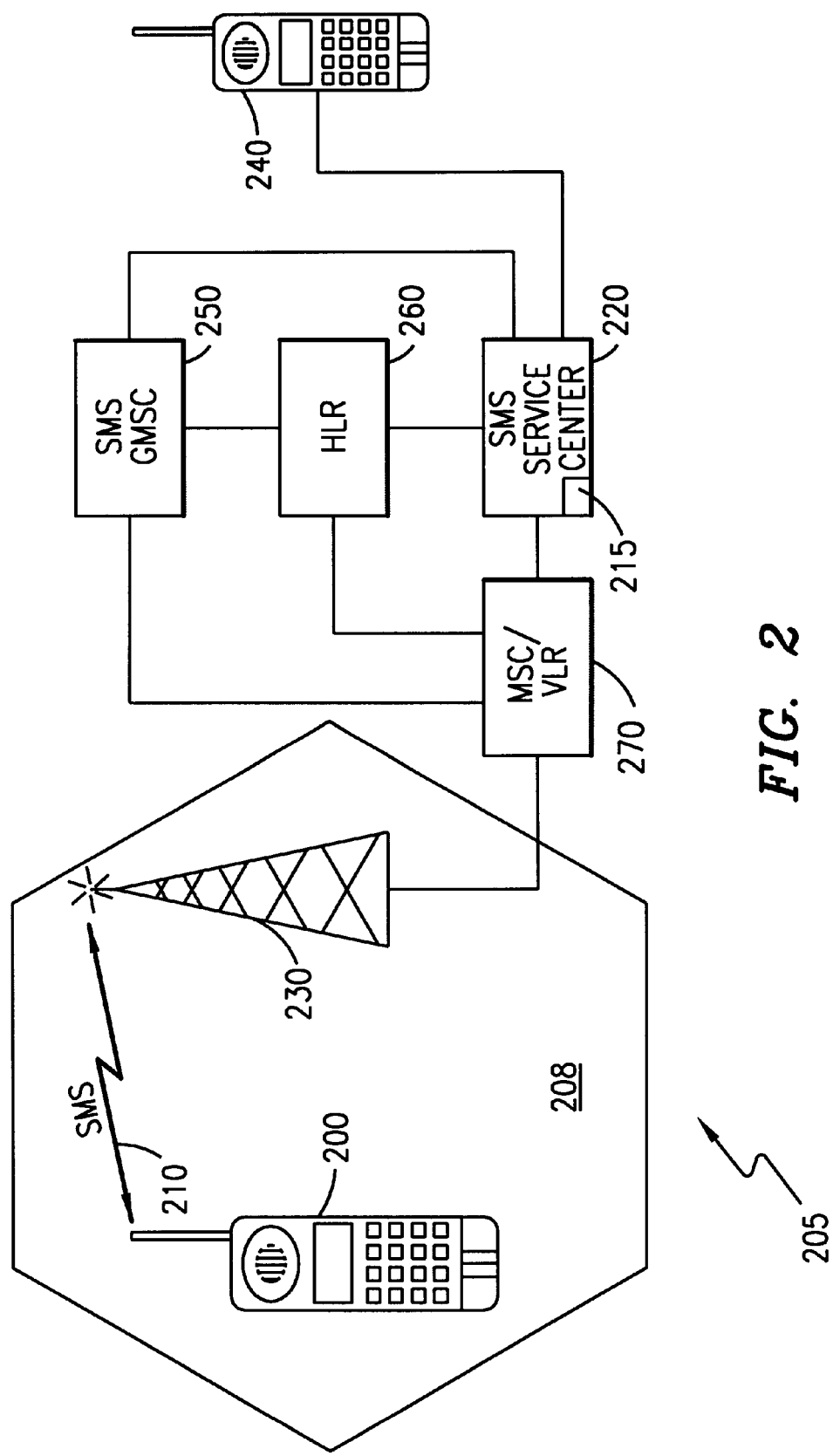
FIG. 2 illustrates the delivery of Short Message Service (SMS) messages to and from a mobile terminal.
Figure 3:
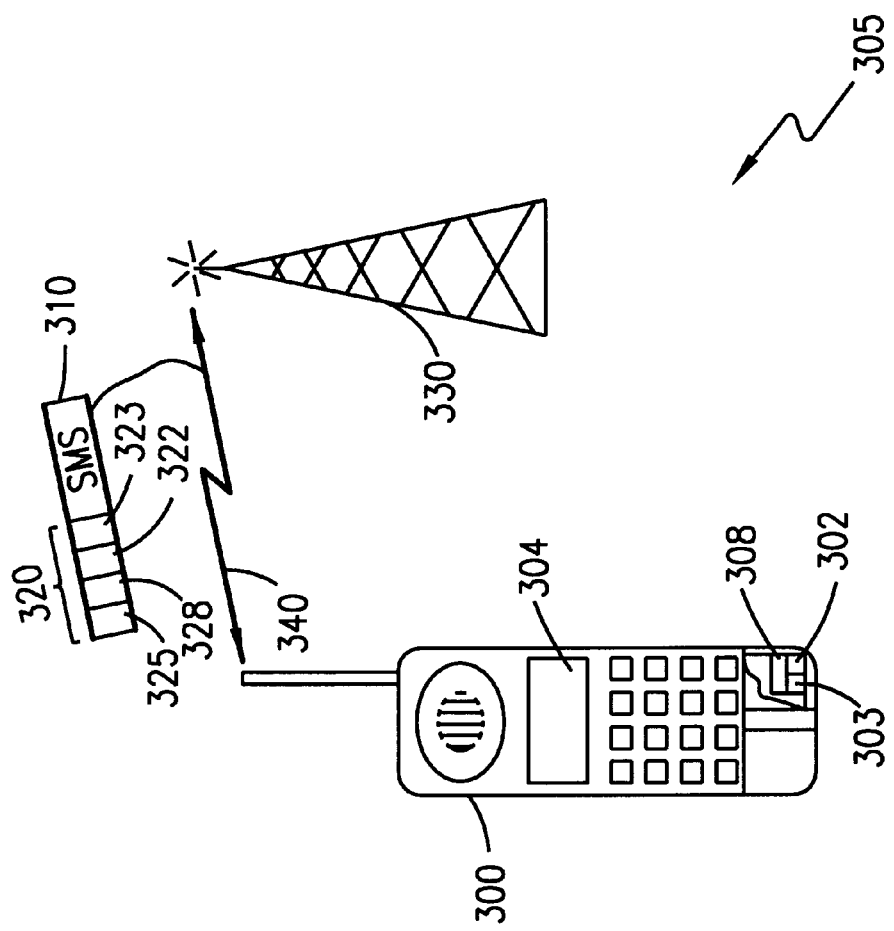
FIG. 3 is a block diagram illustrating the display of a Short Message Service message on the mobile terminals of a predefined group of subscribers.

With reference now to FIG. 3 of the drawings, a header 320 can be included within a Short Message Service (SMS) message 310, which can then be encapsulated and sent to all Mobile Stations (MSs) 300 within a cell 305 via a Base Transceiver Station (BTS) 330 over a broadcast channel 340, e.g., a SMS broadcast channel or a new channel. This header 320 can contain, for example, information regarding the intended recipients of the SMS message 310.

Current SMS messages 310 contain a block type header 325, which indicates that the information following is a SMS message 310. This block type header 325 can be changed to indicate that the SMS message 310 that follows is a "private" message for a group. Furthermore, an additional header 328 can be included, which contains display information regarding the display of the SMS message 310 on a display 304 of the MS 300. For example, a business with 100 employees may want to be able to broadcast a SMS message to all employees within a cell, but not to anyone else. In this case, the block type header information 325 will indicate "private" and the display header 328 can contain a group identification (ID) code indicating the unique user group, which will be able to display the SMS message 310.

A Subscriber Identity Module (SIM) card 308, or other memory, within each of the employees MSs 300 can contain a message application 302, which compares the received group ID to a list 303 of group ID's, which are associated with the MS 300 and stored within the SIM 308, to determine if the SMS message 310 should be displayed to the subscriber on the MS display 304. If the received group ID in the group ID header 328 matches one of the group ID's on the list 303 stored in the SIM 308, the SMS message 310 is displayed to the subscriber. Otherwise, the SMS message 310 is ignored. Likewise, if an MS 300 within the cell 305, which does not have the message application 302, receives a SMS message 310 with the block type header 325 and group ID header 328, the MS 300 will not recognize the headers 325 and 328, and thus, will ignore the SMS message 310. Therefore, a sending subscriber can ensure that only members of the intended group receive the SMS message 310.

Alternatively, additional display information can be included within a header 322 after the block type header 325, such as a language header 322, which indicates the language of the SMS message 310. It should be understood that this additional display header 322 can be included in addition to the group ID header 328 or in place of the group ID header 328. The message application 302 can then compare the received language in the language header 322 with a list 303 of languages understood by the subscriber, which are stored within the SIM card 308, to determine if the SMS message 310 should be displayed. This will allow the subscriber receiving the SMS messages 310 to filter out SMS messages 310 in languages not understood by the subscriber.

Furthermore, in alternative embodiments, additional headers 323 can be included along with group ID 328 and language headers 322, such as a priority header 323, which indicates the priority of the received SMS message 310, e.g., urgent. For example, the receiving subscriber can program the message application 302 within the SIM 303 to display only messages 310 with an urgent indication in the priority header 323. Therefore, when a SMS message 310 is received with a priority header 323, the message application 302 will only display the SMS message 310 on the display 304 of the MS 300 if the priority header 323 indicates that the SMS message 310 is urgent.

As will be recognized by those skilled in the art, the innovative concepts described in the present application can be modified and-varied over a wide range of applications. Accordingly, the scope of patented subject matter should not be limited to any of the specific exemplary teachings discussed.

For example, it should be understood that the SMS organization system and method described herein can be applied to any wireless telecommunications system which utilizes short messages, including, but not limited to, Global System for Mobile Communications (GSM) networks, Personal Communications System (PCS) networks, AMPS networks and D-AMPS networks.

Furthermore, it should be noted that additional headers can be encapsulated within the SMS message after the block type header, which may or may not indicate "private", to indicate various requirements for displaying the SMS message on a particular MS.

What is claimed is:

1. A telecommunications system for controlling the display of a short message on a plurality of mobile terminals, said telecommunications system comprising:
   a base station in wireless communication with said plurality of mobile terminals, said base station broadcasting said short message, said short message having first and second headers encapsulated therein, said first header including a private indicator indicating that said short message is intended only for a particular group of said plurality of mobile terminals, said second header including a particular one of a plurality of group identification codes, said particular group identification code being associated with said particular group of mobile terminals, a given one of said mobile terminals receiving said short message from said base station;
   a memory, within said given mobile terminal, for storing a list of said group identification codes that said given mobile terminal is associated with; and
   comparison means within said given mobile terminal for comparing said received particular group identification code with said list of group identification codes associated with said given mobile terminal, said short message being displayed on said given mobile terminal when said received particular group identification code is within said list of group identification codes.

2. The telecommunications system of claim 1, wherein said comparison means are within said memory.

3. The telecommunications system of claim 1, wherein said memory is a Subscriber Identity Module.

4. The telecommunications system of claim 1, wherein said given mobile terminal is associated with said particular group of mobile terminals, each of said mobile terminal within said particular group of mobile terminals having comparison means therein, said list of group identification codes being stored in each said respective memory of each said mobile terminal with said particular group of mobile terminals, said short message being displayed on each said mobile terminal within said particular group of mobile terminals when said received particular group identification code is within said list of group identification codes.

5. The telecommunications system of claim 4, wherein said mobile terminals within said particular group of mobile terminals do not have identical ones of said list of group identification codes.

6. The telecommunications system of claim 1, wherein said first header is a block type header having said private indicator therein, said private indicator signaling said given mobile terminal to compare said received particular group identification code with said list of group identification codes.

7. The telecommunications system of claim 1, wherein said short message has a third header including a particular language, said memory further storing a list of languages, said short message being displayed when said particular language is within said list of languages.

8. The telecommunications system of claim 1, wherein said short message has a third header encapsulated therein, said third header having additional display information therein, said given mobile terminal having at least one display indicator stored in said memory, said short message being displayed when said additional display information is substantially identical to said display indicator.

9. The telecommunications system of claim 1, wherein said short message is broadcast to said plurality of mobile terminals over a broadcast channel, said short message being a Short Message Service message, said base station being a Base Transceiver Station.

10. The telecommunications system of claim 1, wherein said short message is displayed on a display of said given mobile terminal.

11. A method for controlling the display of a short message on a plurality of mobile terminals, said method comprising the steps of:
   storing, within a memory within a given one of said plurality of mobile terminals, a list of group identification codes that said given mobile terminal is associated with;
   broadcasting, by a base station in wireless communication with said plurality of mobile terminals, said short message, said short message having first and second headers encapsulated therein, said first header including a private indicator indicating that said short message is intended only for a particular group of said plurality of mobile terminals, said second header including a particular one of a plurality of group identification codes, said particular group identification code being associated with said particular group of mobile terminals;
   receiving, by said given mobile terminal, said short message from said base station;
   comparing, by said given mobile terminal, said received particular group identification code with said list of group identification codes associated with said given mobile terminal; and
   displaying, by said given mobile terminal, said short message on said given mobile terminal when said received particular group identification code is within said list of group identification codes.

12. The memory of claim 11, wherein said memory is a Subscriber Identity Module.

13. The memory of claim 11, wherein said given mobile terminal is associated with said particular group of mobile terminals, each said mobile terminal within said particular group of mobile terminals having comparison means therein, said list of group identification codes being stored in each said respective memory of each said respective mobile terminal within said particular group of mobile terminals, said short message being displayed on each said mobile terminal within said particular group of mobile terminals when said received particular group identification code is within said list of group identification codes.

14. The method of claim 13, wherein said mobile terminals within said particular group of mobile terminals do not have identical ones of said list of group identification code.

15. The method of claim 11, wherein said first header is a block type header having said private indicator therein, said private indicator signaling said given mobile terminal to perform said step of comparing.

16. The method of claim 11, wherein said short message has a third header including a particular language, said memory further storing a list of languages, said step of displaying further comprising the step of: displaying said short message on said given mobile terminal when said particular language is within said list of languages.

17. The method of claim 11, wherein said short message has a third header encapsulated therein, said third header having additional display information therein, said given mobile terminal having at least one display indicator stored in said memory, said step of displaying being performed when said additional display information is substantially identical to said display indicator.

18. The method of claim 11, wherein said short message is broadcast to said plurality of mobile terminals over a broadcast channel, said short message being a Short Message Service message, said base station being a Base Transceiver Station.

19. The method of claim 11, wherein said short message is displayed on a display of said given mobile terminal.

20. A Short Message Service message for controlling the display of said Short Message Service message on a plurality of mobile terminals, said Short Message Service message comprising:

a block type header encapsulated within said Short Message Service message, said block type header including a private indicator indicating that said Short Message Service message is intended only for a particular group of said plurality of mobile terminals;

a display header encapsulated within said Short Message Service message, said display header including a particular one of a plurality of group identification codes, said particular group identification code being associated with said particular group of mobile terminals; and a short message encapsulated within said Short Message Service message, said particular group identification code allowing the display of said short message on said mobile terminals within said particular group of mobile terminals.

21. The Short Message Service message of claim 20, further comprising: an additional header including a particular language, said short message being displayed on said mobile terminals within said particular group of mobile terminals that have said particular language associated therewith.

22. The Short Message Service message of claim 20, further comprising an additional display header having additional display information therein, said mobile terminals within said particular group of mobile terminals having said additional display information associated therewith.

* * * * *